United States Patent
Ofenloch

(10) Patent No.: US 12,475,141 B1
(45) Date of Patent: Nov. 18, 2025

(54) DATABASE CLIENT PARALLEL COPY SYSTEMS AND METHODS

(71) Applicant: SAP SE, Walldorf (DE)

(72) Inventor: Dominik Ofenloch, Lampertheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/051,995

(22) Filed: Feb. 12, 2025

(51) Int. Cl.
*G06F 16/00* (2019.01)
*G06F 9/50* (2006.01)
*G06F 16/22* (2019.01)
*G06F 16/27* (2019.01)

(52) U.S. Cl.
CPC .......... *G06F 16/273* (2019.01); *G06F 9/5038* (2013.01); *G06F 16/2282* (2019.01)

(58) Field of Classification Search
CPC ... G06F 16/273; G06F 16/2282; G06F 9/5038
USPC ........................ 707/613, 626, 610
See application file for complete search history.

(56) References Cited

U.S. PATENT DOCUMENTS

2012/0173483 A1* 7/2012 Hartig .................. G06F 9/4856
707/610
2012/0331247 A1* 12/2012 Hoobler, III ........ G06F 11/1458
711/E12.103
2016/0019276 A1* 1/2016 Dahbour ............. G06F 16/2282
707/626

OTHER PUBLICATIONS

Ofenloch, Dominik, "New Client Copy Tool", Technology Blogs by SAP [Online]. Retrieved from the Internet: <URL: https://community.sap.com/t5/technology-blogs-by- sap/new-client-copy-tool/ba-p/13459651>, (Nov. 3, 2020), 59 pgs.

* cited by examiner

*Primary Examiner* — Chelcie L Daye
(74) *Attorney, Agent, or Firm* — SCHWEGMAN LUNDBERG & WOESSNER, P.A.

(57) ABSTRACT

Various examples are directed to systems and methods for copying a source database client to a target database client and exit runtime system may execute a first plurality of exits in a database access trace mode. This may generate first exit trace data describing accesses by the first plurality of exits to at least one of the source database client or the target database client. The system may determine, using the first exit trace data, that a first table of the source database client is accessed by a first exit of the first plurality of exits and a second exit of the first plurality of exits. Based on the determining, the system may modify at least one of the first exit, the second exit, or first execution order data describing an order for executing the first plurality of exits.

20 Claims, 7 Drawing Sheets

DATABASE CLIENT PARALLEL COPY SYSTEMS AND METHODS

BACKGROUND

A database management system (DBMS) can be implemented as part of a suite of software applications that execute together. For example, the DBMS may support various client processes that utilize the DBMS to manage data. In some examples, a DBMS is implemented with a suite of processes that implement an enterprise resource planning (ERP) software solution. An ERP software solution may include one or more ERP applications. The ERP applications execute in conjunction with the DBMS to manage various different aspects of business operations. An example ERP software solution is the S/4 HANA product available from SAP SE of Walldorf, Germany.

BRIEF DESCRIPTION OF DRAWINGS

The present disclosure is illustrated by way of example and not limitation in the following figures.

DETAILED DESCRIPTION

Figure 1:
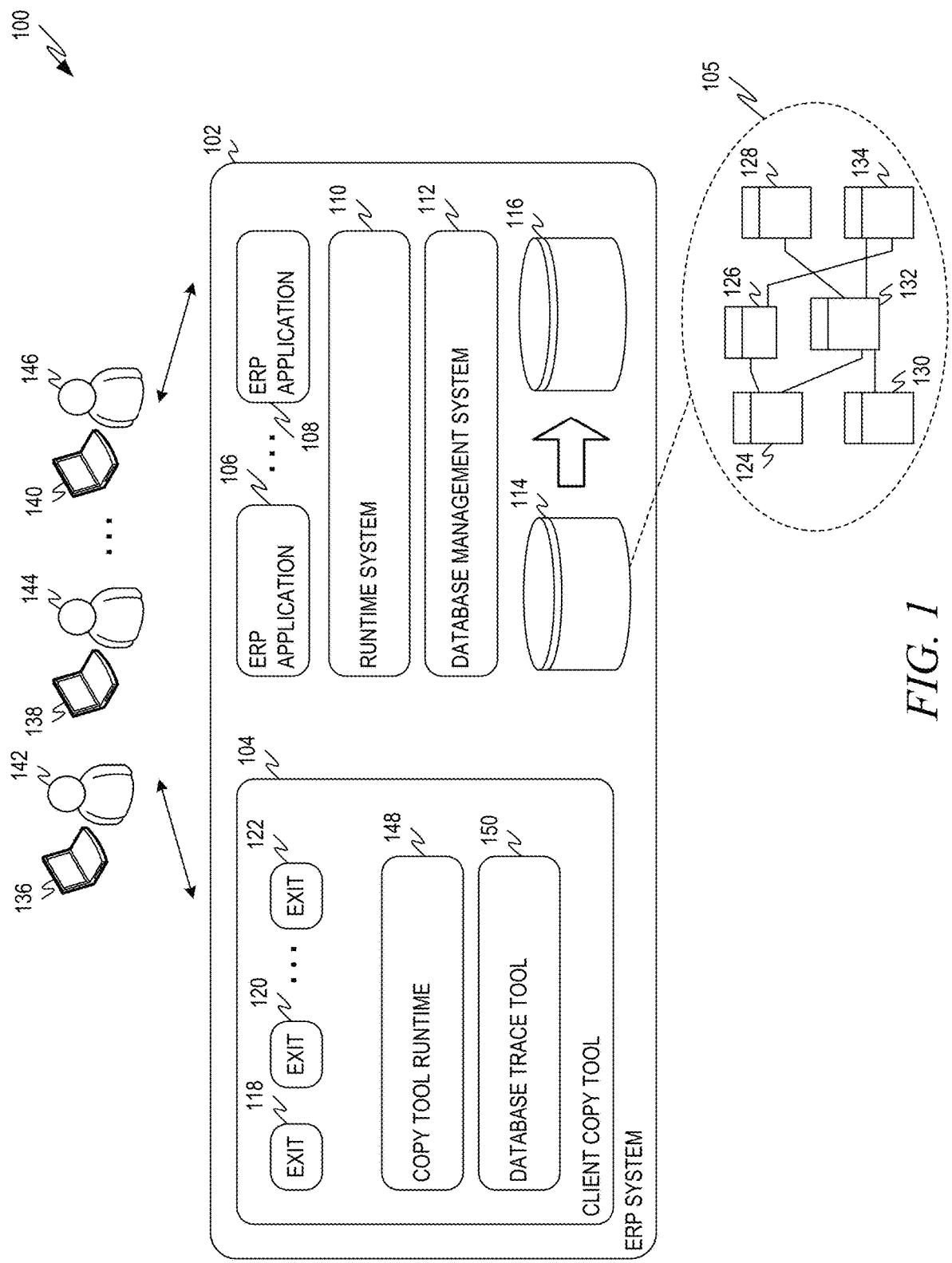
FIG. 1 is a diagram showing one example of an environment comprising an ERP system executing a client copy tool for copying a source database client to a target database client.

Enterprise resource planning (ERP) applications generate and utilize the data stored at one or more database management systems (DBMS) to perform different enterprise operations. For example, an ERP application supporting a human resources operation may store employee records at the DBMS. The human resources ERP application may perform various tasks such as, for example, managing payroll, benefits, and/or the like. An example ERP application supporting accounting may use records managed by the DBMS to perform various accounting-related tasks such as posting transactions, reconciling accounts, and/or the like. An ERP application supporting operations may manage and generate various purchase orders, shipping orders, and/or the like to manage manufacturing or other operations.

ERP applications may utilize tables at the DBMS to store various enterprise data. For example, tables at the DBMS may be divided into rows and columns. Each row of a table may be referred to as a record. Each record may have multiple fields, where each field of a record corresponds to a column of the table including the record. Consider the example human resources ERP application described above. Such an ERP application may utilize an example employee table at the DBMS having records corresponding to employees and columns/fields corresponding to employee attributes such as, name, address, position, salary, and/or the like. Fields of a record may be filled or unfilled. A field of a record is filled if the field includes data. The field of a record is unfilled if the field does not contain data or if the field contends nonce or placeholder data.

In some examples, the data used by ERP applications may be divided into distinct database clients. Each database client may be associated with a separate set of data. For example, users associated with one database client may utilize an ERP application or applications with respect to data for that database client only. Users associated with one database client may not access data stored for other database clients.

Database clients may be used to segregate data between different customer entities. Consider an example in which a software provider entity provides an ERP system including access to one or more ERP applications. Customer entities may purchase access to the ERP system. Different customer entities may be assigned different database clients. For example, a first customer entity may be associated with a first database client and a second customer entity may be associated with a second database client. Users associated with the first customer entity may access the ERP system and use one or more ERP applications using data from the first database client. The users associated with the first customer entity may not have access to the second customer entity's data stored at the second database client.

In some examples, multiple database clients may be used by a single customer entity, for example, to implement different environments. A single customer entity may use a first database client to implement a production environment. The customer entity may use a second database client to implement other environments such as, for example, a testing environment, a training environment, and/or the like. In this way, users may access the production environment to conduct the business of the customer entity. Users may access other database clients for other purposes such as, for example, testing, training, and/or the like, without affecting production data at the production database client.

Database clients may be implemented in various different ways. In some examples, the ERP system may segregate database clients into separate databases. For example, different database clients may utilize different tables having different schemas and/or the like. In some examples, different database clients may be implemented in a common database. For example, database client-specific records at the common database may be described by a database client key. Queries against the database from users associated with a particular database client may utilize the database client key to ensure that considered data is drawn from the appropriate database client.

In some examples, it is desirable to generate a copy of a database client. A copy may be created, for example, as a backup of a production or other source database client. In some examples, a copy of a database client is created to implement and/or update a non-production environment. For example, a customer entity may generate a copy of its production environment database client for the purpose of creating or updating a testing environment, a training environment, and/or the like.

In some examples, a client copy tool may be used to create a copy of a source database client at a target database client.

The client copy tool may operate in different phases. During a pre-copy analysis phase, the client copy tool may translate user parameters for the copy into an enumeration of the data to be copied. The output of the pre-copy analysis phase may include a description of data, such as tables or other data structures, that are to be copied and/or deleted at the target database client. In some examples, the output may include a list of tables or other data structures to be copied and a list of tables or other data structures to be deleted. During a copy and deletion phase, the client copy tool may read data from the source database client, write the data to the target database client, and delete from the target database client any data that the user did not intend to be part of the copy. After the copy and delete phase, and a postprocessing phase may unpack copied data and otherwise arrange the target database client.

In some examples, it is desirable for the pe-copy analysis and postprocessing phases to be user-configurable. For example, it may not be desirable to make an exact copy of the source database client. Instead, it may better suit the needs of the user to copy some tables and not others, to modify some tables, and/or to otherwise change the way that data from the source database client is copied. Also, it is often desirable for users to specify the way that data is unpacked and arranged at the target database client.

To facilitate user configurability, the client copy tool may include various exits for performing pre-copy analysis tasks and/or postprocessing tasks. Exits are software code that may be executed, for example, by a runtime system of the client copy tool and/or a database management system to perform one or more processing tasks. In some examples, an exit is a single class. Exits may be coded in any suitable programming language such as, for example, Java or Advanced Business Application Programming (ABAP).

In some examples, the exits for implementing the pre-copy analysis and postprocessing phases may be coded by users associated with the customer entity. This may permit the customer entities to customize the pre-copy analysis and postprocessing phases according to their needs.

Another design consideration associated with the client copy tool is speed. It may be desirable to complete the copy of a database client in a timely manner. One way to accelerate the client copy tool is to execute portions of the tool in parallel. Parallel execution of the client copy tool, however, includes a risk of data collisions and potential corruption at the target database client. For example, if multiple operations access a particular table or record, the accesses may need to be performed in an expected way or in an expected order.

In some examples, arranging a client copy tool to use exits during the pre-copy analysis and postprocessing phases makes it more difficult to parallelize the execution of those phases. For example, the copy phase may be executed using software components coded by the software provider entity. Accordingly, the software provider entity may be familiar with the execution of these software components and may, therefore, configure the components and/or modify an execution order of the copy and deletion software components to allow some of the components to be executed in parallel. This may be more challenging for the pre-copy analysis and postprocessing phases implemented by exits that may be coded by the customer entities. For example, executing the exits without an understanding of how the exits access the target database client and/or the source database client may result in data collisions and corruption, as described herein.

Various examples address these and other challenges by an initial execution of pre-copy and/or postprocessing exits in a database access traces mode. The database access trace mode may be implemented, for example, by a runtime system for executing the exits. The runtime system may generate exit trace data for each executed exit. The exit trace data may describe each database access during the execution of the exit. The client copy tool may utilize the exit trace data to detect conflicts between exits. A conflict may occur between two exits if the exits both access the same table or other unit of data at the source database client and/or the target database client.

When a conflict is detected between two or more exits, a modification may be made to one or more of the exits and/or to an execution order of the exits. After the modification or modifications, the client copy tool may perform a client copy while executing some or all of the various pre-copy analysis exits and/or postprocessing exits in parallel. In this way, the speed of the client copy tool may be increased while the risk of data collisions and/or data corruption may be reduced.

FIG. 1 is a diagram showing one example of an environment 100 comprising an ERP system 102 executing a client copy tool 104 for copying a source database client 114 to a target database client 116. The ERP system 102 also comprises ERP applications 106, 108, a database management system (DBMS) 112, and a runtime system 110. The client copy tool 104, ERP applications 106, 108, database management system, and runtime system 110 include an executable code that is executed at the ERP system 102.

The ERP applications 106, 108 may be any suitable ERP application such as, for example, an operations management application, a human resources application, an accounting application, and/or the like. Example ERP applications include an analytics software solution such as the SAP® Analytics Cloud application available from SAP SE of Walldorf, Germany, a human capital management software solution such as SAP SuccessFactors®, also available from SAP SE of Walldorf, Germany, a project management software solution such as SAP Portfolio and Project Management (PaPM), also available from SAP SE of Walldorf, Germany. Also, although two ERP applications 106, 108 are shown in FIG. 1, it will be appreciated that the ERP system 102 may execute more or fewer ERP applications.

The DBMS 112 may manage one or more databases including data making up one or more database clients. In some examples, the DBMS 112 manages one or more databases implementing the source database client 114 and the target database client 116. FIG. 1 also shows an example schema 105 associated with the source database client 114. The schema 105 may describe various tables and relationships therebetween. The example of FIG. 1 shows example tables 124, 126, 128, 130, 132, 134 and relationships therebetween. It will be appreciated, however, that the schema 105 may comprise any suitable number of tables having any suitable set of relationships with one another.

Users 142, 144, 146 may access the ERP system 102 utilizing user computing devices 136, 138, 140. The user computing devices 136, 138, 140 may be any suitable computing device such as, for example, a mobile computing device, a laptop computing device, a desktop computing device, and the like. In some examples, users 142, 144, and 146 may access the ERP system 102 to utilize the functionality of the ERP applications 106, 108. Some or all of the users 142, 144, 146 may also utilize the client copy tool 104. For example, some or all of the users 142, 144, 146 may code exits 118, 120, 122 for implementing pre-copy analysis and/or postprocessing as described herein. Users 142, 144,

146 may also utilize the client copy tool 104 to initiate and/or manage a copy of the source database client 114 to the target database client 116.

In some examples, the ERP system 102 is implemented in a cloud environment, such as, for example, a public cloud environment or a private cloud environment. In a private cloud environment, the customer enterprise may provide executables and other files to implement the ERP system 102. In a public cloud environment, users associated with the customer enterprise are provided with access to the ERP system 102 through one of a number of tenancies. Each tenancy may be associated with one or more database clients. A software provider enterprise may provide executables and other files to implement the ERP system 102 and, in some examples, may also maintain the ERP system 102 and the various tenancies. In some examples, the ERP system 102 is an on-premises system implemented, for example, by the customer enterprise.

The exits 118, 120, 122 are executable software components that may be coded in any suitable programming language such as, for example, Java or ABAP. Each exit, when executed, may perform a task related to a client copy. Some of the exits 118, 120, 122 may be pre-copy analysis exits. When executed, a pre-copy analysis exit may perform one or more pre-copy tasks, for example, as described herein. Some of the exits 118, 120, 122 may be postprocessing exits. When executed, a postprocessing exit may perform one or more postprocessing tasks, for example, as described herein.

The ERP system 102 may execute a runtime system 110 to manage the execution of the exits 118, 120, 122. The runtime system 110, in some examples, is executed as part of the DBMS 112 and/or as part of the client copy tool 104. The runtime system 110 may be instructed to execute one or more of the exits 118, 120, 122. When the runtime system 110 is instructed to execute an exit 118, 120, 122, the runtime system 110 may be provided with access to the exit 118, 120, 122. The exit 118, 120, 122 may be provided to the runtime system 110 as source code and/or as a compiled binary. The runtime system 110 may manage the execution of the exit 118, 120, 122 for example, by processing and executing statements from the exit 118, 120, 122. In examples where the exits 118, 120, 122 are coded in Java, the runtime system 110 may be or include a Java virtual machine.

The client copy tool 104 comprises exits 118, 120, 122, a copy tool runtime 148, and a database trace tool 150. During a pre-copy analysis phase, the client copy tool 104 may instruct the runtime system 110 to execute a number of the exits 118, 120, 122 that are pre-copy analysis exits. Each pre-copy analysis exit may perform one or more pre-copy tasks. A pre-copy task may include instructions or parameters of the copy, such as, for example, a parameter received from a user 142, 144, 146. Consider an example where the user 142, 144, 146 desires to copy the purchase order data relating to purchase orders from North America, but not copy the purchase order data relating to purchase orders from Europe. An example pre-copy exit may perform a pre-copy task by identifying records at a purchase order table that relate to North America and Europe. The pre-copy task may also include writing an indication of records, tables, and/or the like that are to be copied to the target database client 116 (e.g., records relating to North America purchase orders) and an indication of records, tables, and/or the like that are to be deleted from the target database client 116 (e.g. records related to European purchase orders). Another example pre-copy task that may be performed by a pre-copy exit may include packing selected data into a new table and generating an indication that the new table is to be copied to the target database client 116.

The output of the pre-copy analysis phase may include a description of data to be copied to the target database client 116 and a description of data to be deleted from the target database client 116. Upon execution of the pre-copy analysis exits 118, 120, 122, the copy tool runtime 148 may execute to copy and/or delete data in a copy and delete phase.

Upon completion of the copy and delete phase, the client copy tool 104 may instruct the runtime system 110 to execute a number of the exits 118, 120, 122 that are postprocessing exits. Each postprocessing exit may, when executed, because the performance of one or more postprocessing tasks. Postprocessing tasks may include tasks that unpacked and/or prepare data at the target database client 116. For example, postprocessing tasks may include arranging the target database client 116 according to the schema 105 of the source database client 114. In some examples, the postprocessing exits may arrange the target database client 116 according to a different schema than the schema 105, for example, as indicated by the users 142, 144, 146.

The database trace tool 150 of the client copy tool 104 may be configured to detect and address conflicts between exits 118, 120, 122. For example, prior to executing a copy, the database trace tool 150 may instruct the runtime system 110 to conduct a test execution of some or all of the exits 118, 120, 122 in a database access trace mode. The test execution of the exits may be performed on the source database client 114 and the target database client 116 and/or may be performed on a dummy set of source and target database clients.

When the runtime system 110 executes exits in the database access trace mode, the runtime system 110 may generate exit trace data for each executed exit. The exit trace data may describe each access made by the exit 118, 120, 122 through the database management system 112 such as, for example, to the source database client 114 and/or the target database client 116. The database trace tool 150 may utilize the exit trace data generated by the runtime system 110 for the various exits 118, 120, 122 to identify any exits 118, 120, 122 that access a common table 124, 126, 128, 130, 132, 134. The database trace tool 150 may detect a conflict between two or more exits 118, 120, 122 if the two or more exits access the same database table. In some examples, the database trace tool 150 may detect a conflict between two or more exits 118, 120, 122 if the two or more exits access the same database table more than a threshold number of times and/or at greater than a threshold frequency.

If a conflict is detected between two or more exits 118, 120, 122, the database trace tool 150 may modify the exits 118, 120, 122 and/or an execution order for the exits 118, 120, 122. For example, one or more of the conflicting exits 118, 120, 122 may be modified to remove access to an indicated table, thus removing the conflict. In other examples, the database trace tool 150 may modify an execution order for conflicting exits 118, 120, 122, for example, by generating execution order data describing the order in which the exits 118, 120, 122 are executed. For example, the exits 118, 120, 122 may be executed in a consistent execution order to avoid race conditions or data corruption.

After modifications are made to the exits 118, 120, 122 and/or to execution order data, the client copy tool 104 may execute a client copy of the source database client 114 to the target database client 116. This may include executing the pre-copy analysis phase, copy and delete phase, and postprocessing phase as described herein. The pre-copy analysis phase and/or postprocessing phase may be performed by executing at least a portion of the exits 118, 120, 122 in parallel. For example, exits 118, 120, 122 that were not indicated to conflict may be executed in parallel. Also, for example, exits 118, 120, 122 that were indicated to conflict, but modified to remove the conflict may be executed in parallel. Exits 118, 120, and 122 that were indicated to conflict and were not modified may be executed sequentially, for example, according to the execution order indicated by the execution order data.

Figure 2:
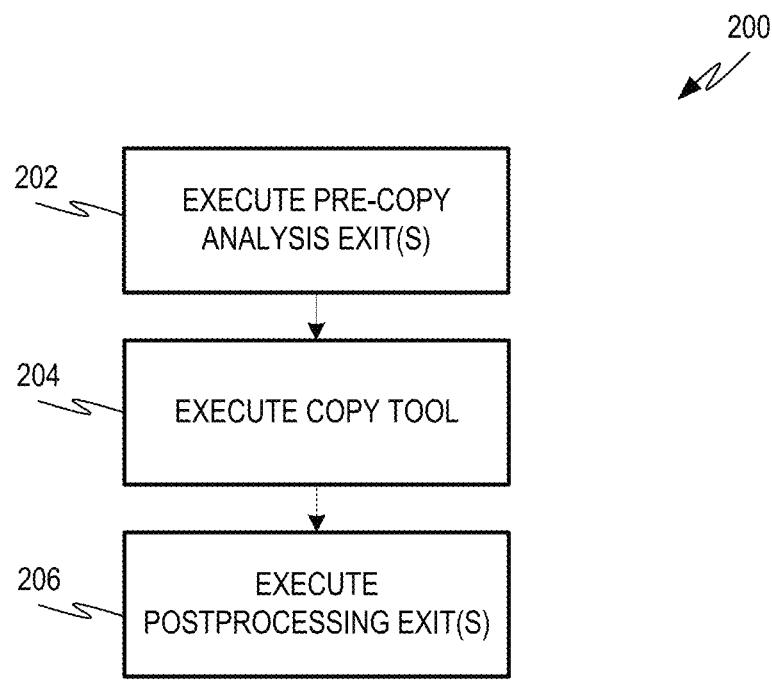
FIG. 2 is a flowchart showing one example of a process flow that may be executed by the client copy tool to implement a client copy of a source database client to a target database client.

FIG. 2 is a flowchart showing one example of a process flow 200 that may be executed by the client copy tool 104 to implement a client copy of a source database client, such as the source database client 114, to a target database client, such as the target database client 116. At operation 202, the client copy tool 104 may execute pre-copy analysis exits. This may include exits 118, 120, 122 that are programmed to perform pre-copy tasks. Example pre-copy tasks include identifying tables, records, and/or the like that meet the criteria defined by a user 142, 144, 146, packing records to be copied into a new table or tables, and/or the like. The executing of the pre-copy analysis exits may implement the exit analysis phase and result in a list of tables and/or other data structures to be copied to the target database client 116. In some examples, as described herein, two or more exits of the pre-copy exits may be executed in parallel.

At operation 204, the client copy tool 104 may execute the copy tool runtime 148. The copy tool runtime 148 may receive as input the list of tables and/or other data structures to be copied to the target database client 116. The client copy tool may read the tables and/or other data structures that are to be copied from the source database client 114 and write them to the target database client 116. In some examples, the client copy tool 104 may comprise multiple executables and/or multiple threads that may be executed in parallel.

At operation 206, the client copy tool may execute postprocessing exits to perform postprocessing tasks. Example postprocessing tasks include unpacking and writing records from the unpacked tables to appropriate tables at the target database client 116. For example, postprocessing tasks may include arranging the target database client 116 according to the schema 105 of the source database client 114. In some examples, the postprocessing exits may arrange the target database client 116 according to a different schema than the schema 105, for example, as indicated by the users 142, 144, 146. In some examples, as described herein, two or more exits of the postprocessing exits may be executed in parallel.

Figure 3:
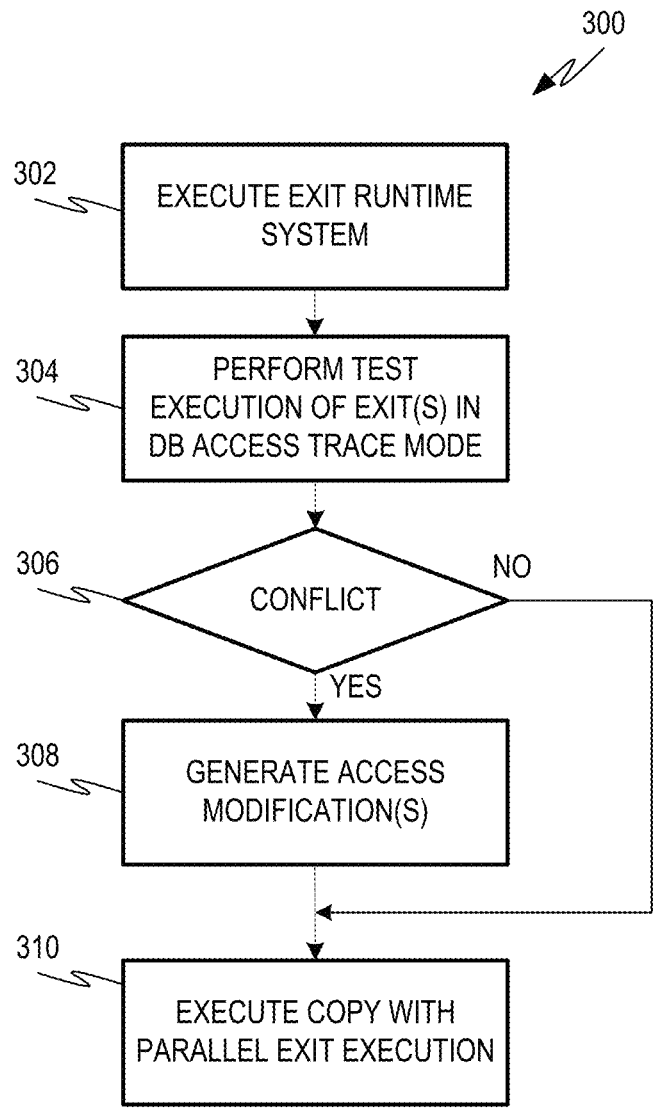
FIG. 3 is a flowchart showing one example of a process flow for performing a copy of a source database client using parallel exit execution.

FIG. 3 is a flowchart showing one example of a process flow 300 for performing a copy of a source database client using parallel exit execution. At operation 302, the ERP system 102 may execute the runtime system 110. At operation 304, the ERP system 102 (e.g., the client copy tool 104) may perform a test execution of some or all the exits 118, 120, 122 for performing a client copy. The test execution may be performed with the runtime system 110 arranged to a database access trace mode. The test execution may include executing pre-copy analysis exits, postprocessing exits, and/or both pre-copy and postprocessing exits.

In some examples, runtime systems, such as a runtime system for managing the execution of APAB code or a job on a virtual machine, may have various trace modes for debugging or testing code. In some examples, executing an exit in the database access trace mode may involve providing the runtime system 110 with code that instructs the runtime system 110 to enable the trace mode. The code may be provided to the runtime system 110 as part of one or more of the exits 118, 120, 122 and/or may be provided as a separate file. CODE SEGMENT 1 below shows example code for enabling trace mode in a runtime system 110 configured for handling APAB code:

```
CODE SEGMENT 1:
IF trace_enabled = abap_true.
   trace_session =
   init_trace (     i_method         =       i_method
                    i_class          =       i_class ) .
   SET RUN TIME ANALYZER ON %_INTERNAL.
ENDIF.
CREATE OBJECT exit TYPE (i_class) .
result =
execute exit (     i_class          =       i_class
                   i_exit           =       exit
                   i_method         =       i_method
                   i_import         =       i_import
                   i_breakpoint     =       i_breakpoint ) .
IF trace enabled = abap true.
   SET RUN TIME ANALYZER OFF %_INTERNAL.
   trace session->stop ( ) .
   trace file = trace session->get trace file ( ) .
ENDIF.
```

The runtime system 110 may generate exit trace data describing database accesses of each executed exit. When the test execution of the exits at operation 304 is complete, the runtime system 110 may be reconfigured to disable the trace mode. Accordingly, subsequent executions of exits 118, 120, 122 may be performed without using the trace mode (unless the trace mode is subsequently re-enabled).

At operation 306, the ERP system 102 (e.g., the database trace tool 150) may determine if there are any conflicts between the exits executed during the test execution. If a conflict is detected, the ERP system 102 (e.g., the database trace tool 150) may, at operation 308, generate modifications to the way that the exits access data. This may include modifying one or more of the conflicting exits to remove a database access and/or modifying an execution order of the exits. In some examples, the database trace tool 150 is configured to directly make changes to conflicting exits and/or write changes to execution order data describing an order of execution for the exits. In other examples, the database trace tool 150 may send a conflict message to one or more users 142, 144, 146 inviting the users 142, 144, 146 to make modifications. The user or users 142, 144, 146 may provide one or more modified exits and/or modified execution order data.

After operation 308, or if no conflicts are detected at operation 306, the client copy tool 104 may execute a client copy from the source database client 114 to the target database client 116 using parallel exit execution at operation 310. This may include executing the pre-copy analysis, copy and delete, and postprocessing phases described herein, for example, with respect to FIG. 2. Operation 310 may include re-executing that were test executed at operation 304, with any access modifications made at operation 308.

Figure 4:
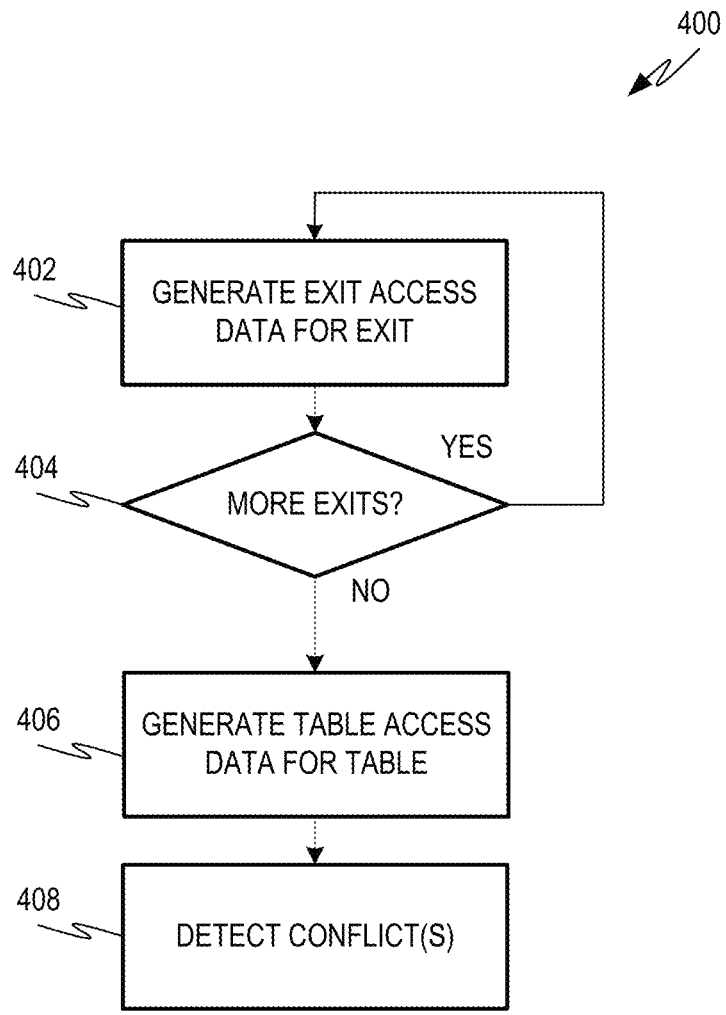
FIG. 4 is a flowchart showing one example of a process flow for detecting a conflict between exits based on exit trace data generated during a test execution of exits.

FIG. 4 is a flowchart showing one example of a process flow 400 for detecting a conflict between exits 118, 120, 122 based on exit trace data generated during a test execution of exits 118, 120, 122. The runtime system 110 may generate exit trace data for each exit that is executed during the test execution. The exit trace data for each exit may describe database accesses made by the first exit during the test execution. For example, the exit trace data may list each individual database access made by the exit during its execution along with the type of access such as, for example, a read or a write.

At operation 402, the database trace tool 150 may generate exit access data for an exit from the exit trace data for the exit. The exit access data for the first exit may be an aggregation of accesses indicated by the exit trace data. For example, the database trace tool 150 may characterize the way that the exit access various database tables as read access, right access, or read/write access. Read access with respect to a table may be indicated if the exit read from a table but did not write to the table. Write access with respect to a table may be indicated if the exit wrote to a table but did not read from the table. Read/write access with respect to a table may be indicated if an exit read from and wrote to a table. Example exit access data for an example exit is given by TABLE 2 below:

TABLE 2

| Table | Access Type | Number of Accesses | Duration |
|---|---|---|---|
| TabA | Read | 10 | 100 ms |
| TabB | Write | 1 | 10 ms |
| TabC | Read/Write | 5 | 50 ms |

In the example of TABLE 2, the described exit made at least one read request of TabA and no write requests of TabA. It made at least one write request of TabB and no read requests of TabB. It also made at least one read request and at least one write request of TabC.

At operation 404, the database trace tool 150 may determine if any exits that were executed during the test execution have yet to be considered at operation 402. If there are any additional exits for consideration, the database trace tool 150 may return to operation 402 and generate exit access data for a next exit.

When all exits executed during the test execution have been considered at operation 402, the database trace tool may, at operation 406, use the exit access data generated at operation 402 to generate table access data for some or all of the tables that were accessed during the test execution. This may include, for example, aggregating the exit access data to indicate, for each accessed table, a number of exits that made read access to the table during the test execution, a number of exits that made right access to the table during the test execution, and a total number of exits using the table. Example table access data by TABLE 2 below:

TABLE 3

| Table | Access Type | Number of Reading Exits | Number of Writing Exits | Usage Count |
|---|---|---|---|---|
| TabA | Read | 1 | 0 | 1 |
| TabB | Write | 0 | 2 | 2 |
| TabC | Read + Write | 2 | 1 | 3 |

In the example of TABLE 3, a single exit had read access to the table TabA. Two exits had write access to the table TabB. Two exits had read access to table TabC and one exit had write access to TabC.

At operation 408, the database trace tool 150 may utilize the table access data and the exit access data to detect conflicts between exits. For example, the database trace tool 150 may determine a conflict at a table if the table is accessed by two or more exits. The table access data may be utilized to identify tables that are accessed by two or more exits. The exit access data may then be utilized to identify the specific exits that accessed the subject table. In other examples, other criteria may be used to detect a conflict at a table. For example, a table that has been read accessed only may not be considered a conflict even if two or more exits read from the table.

Figure 5:
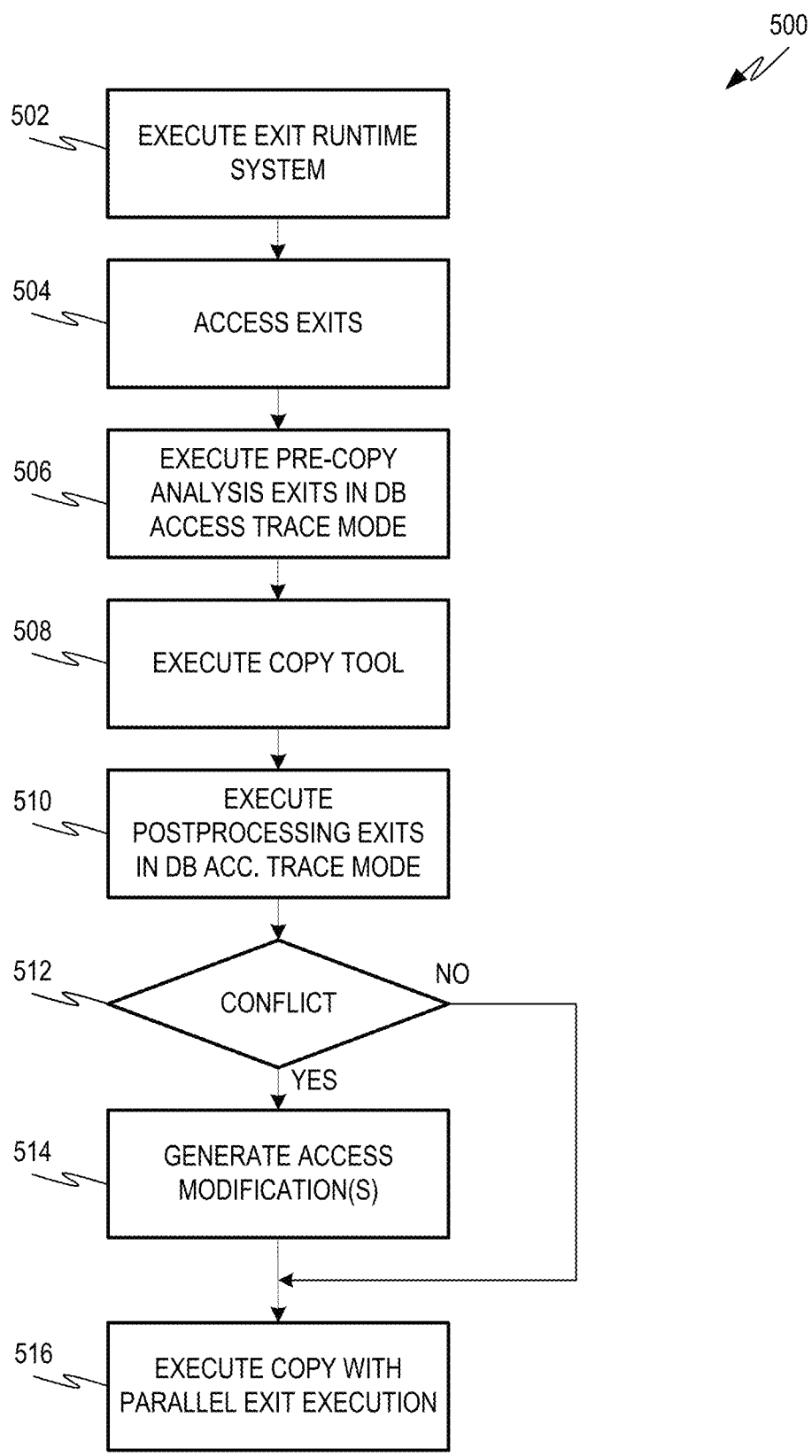
FIG. 5 is a flowchart showing another example of a process flow for performing a copy of a source database client using parallel exit execution.

FIG. 5 is a flowchart showing another example of a process flow 500 for performing a copy of a source database client using parallel exit execution. The process flow 500 demonstrates an example method of performing a test execution of both pre-copy analysis exits and postprocessing exits.

At operation 502, the ERP system 102 may execute the runtime system 110. At operation 504, the ERP system 102 (e.g., the client copy tool 104) may access exits 118, 120, 122. At operation 506, the ERP system 102 may perform a test execution of the pre-copy analysis exits with the runtime system 110 configured to database access trace mode. This may result in exit trace data for each of the executed traces. At operation 508, the ERP system 102 may execute the copy tool runtime 148 to copy the source database client 114 to the target database client 116. At operation 510, the ERP system 102 may perform a test execution of postprocessing exits with the runtime system 110 configured to database trace mode. At operation 512, the ERP system 102 (e.g. the database trace tool 150) may determine if the results of the test execution of the pre-copy analysis exits or the test execution of the postprocessing exits indicated a conflict. If a conflict is determined, the ERP system 102 may generate one or more access modifications at operation 514. If no conflict is detected and/or after generating the access modifications at operation 514, the ERP system 102 may execute a client copy with one or more of the exits executing in parallel.

In some examples, the operation 516 may be performed on the same source database client 114 and target database client 116 as the operations 506, 508, and 510. In other examples, the operation 516 may be performed with respect to other source database clients and target database clients. For example, the access modifications generated at operation 514 may apply to other client copies performed using the client copy tool 104 with the same set of exits 118, 120, 122.

In view of the disclosure above, various examples are set forth below. It should be noted that one or more features of an example, taken in isolation or combination, should be considered within the disclosure of this application.

Example 1 is a system for copying a source database client to a target database client, comprising: at least one processor programmed to perform operations comprising: accessing, by an exit runtime system executing at the at least one processor, a first plurality of exits, each exit of the first plurality of exits comprising software code for performing a pre-copy task; executing, by the exit runtime system, the first plurality of exits in a database access trace mode, the executing of the first plurality of exits generating first exit trace data describing accesses by the first plurality of exits to at least one of the source database client or the target database client; determining, using the first exit trace data, that a first table of the source database client is accessed by a first exit of the first plurality of exits and a second exit of the first plurality of exits; based on the determining that the first table of the source database client is accessed by the first exit and the second exit, modifying at least one of the first exit, the second exit, or first execution order data describing an order for executing the first plurality of exits; after the modifying of at least one of the first exit, the second exit, or the first execution order data, re-executing the first plurality of exits, the re-executing of the first plurality of exits comprising executing at least two of the first plurality of exits in parallel, the re-executing of the first plurality of exits generating exit result data; and copying at least a portion of source database client data from the source database client to the target database client, the copying being based at least in part on the exit result data.

In Example 2, the subject matter of Example 1 optionally includes the operations further comprising: accessing, by the exit runtime system, a second plurality of exits, each exit of the second plurality of exits comprising software code for performing a postprocessing task; executing, by the exit runtime system, the second plurality of exits in the database access trace mode, the executing of the second plurality of exits generating second exit trace data describing accesses by the second plurality of exits to at least one of the source database client or the target database client; determining, using the second exit trace data, that a second table of the source database client is accessed by a third exit of the second plurality of exits and by a fourth exit of the second plurality of exits; based on the determining that the second table of the source database client is accessed by the third exit and by the fourth exit, modifying at least one of the third exit, the fourth exit, or second execution order data describing an order for executing the second plurality of exits; and after the modifying of the third exit, the fourth exit, or the second execution order data, and after the copying, re-executing the second plurality of exits, the re-executing of the second plurality of exits comprising executing at least two of the second plurality of exits in parallel.

In Example 3, the subject matter of any one or more of Examples 1-2 optionally includes the modifying of at least one of the first exit, the second exit, or the first execution order data comprising modifying at least one of the first exit or the second exit to remove access to the first table.

In Example 4, the subject matter of any one or more of Examples 1-3 optionally includes the modifying of at least one of the first exit, the second exit, or the first execution order data comprising modifying the first execution order data to indicate that the first exit and the second exit are to execute sequentially, the re-executing of the first plurality of exits comprising executing the first exit before executing the second exit.

In Example 5, the subject matter of any one or more of Examples 1-4 optionally includes the operations further comprising before re-executing the first plurality of exits, configuring the exit runtime system to disable the database access trace mode.

In Example 6, the subject matter of any one or more of Examples 1-5 optionally includes the modifying of at least one of the first exit, the second exit, or the first execution order data comprising: generating a conflict message describing the accessing of the first table by the first exit and by the second exit; sending the conflict message to a user; and receiving, from the user, a modification to at least one of the first exit, the second exit, or the first execution order data.

In Example 7, the subject matter of any one or more of Examples 1-6 optionally includes the operations further comprising: generating first exit access data using the first exit trace data, the first exit access data describing at least one table from the source database client or the target database client accessed by the first exit during the executing of the first plurality of exits in the database access trace mode; and generating second exit access data using the first exit trace data, the second exit access data describing at least one table from the source database client or the target database client accessed by the second exit during the executing of the first plurality of exits in the database access trace mode, the determining that the first table of the source database client is accessed by the first exit and the second exit being based at least in part on the first exit access data and the second exit access data.

In Example 8, the subject matter of Example 7 optionally includes the operations further comprising generating first table access data using the first exit access data and the second exit access data, the first table access data describing accesses to the first table by exits of the first plurality of exits during the executing of the first plurality of exits in the database access trace mode, the determining that the first table of the source database client is accessed by the first exit and the second exit being based at least in part on the first table access data.

In Example 9, the subject matter of Example 8 optionally includes the generating of the first table access data being based at least in part on the first exit access data and the second exit access data.

Example 10 is a method of copying a source database client to a target database client, the method comprising: accessing, by an exit runtime system, a first plurality of exits, each exit of the first plurality of exits comprising software code for performing a pre-copy task, the exit runtime system comprising at least one executable software component; executing, by the exit runtime system, the first plurality of exits in a database access trace mode, the executing of the first plurality of exits generating first exit trace data describing accesses by the first plurality of exits to at least one of the source database client or the target database client; determining, using the first exit trace data, that a first table of the source database client is accessed by a first exit of the first plurality of exits and a second exit of the first plurality of exits; based on the determining that the first table of the source database client is accessed by the first exit and the second exit, modifying at least one of the first exit, the second exit, or first execution order data describing an order for executing the first plurality of exits; after the modifying of at least one of the first exit, the second exit, or the first execution order data, re-executing the first plurality of exits, the re-executing of the first plurality of exits comprising executing at least two of the first plurality of exits in parallel, the re-executing of the first plurality of exits generating exit result data; and copying at least a portion of source database client data from the source database client to the target database client, the copying being based at least in part on the exit result data.

In Example 11, the subject matter of Example 10 optionally includes accessing, by the exit runtime system, a second plurality of exits, each exit of the second plurality of exits comprising software code for performing a postprocessing task; executing, by the exit runtime system, the second plurality of exits in the database access trace mode, the executing of the second plurality of exits generating second exit trace data describing accesses by the second plurality of exits to at least one of the source database client or the target database client; determining, using the second exit trace data, that a second table of the source database client is accessed by a third exit of the second plurality of exits and by a fourth exit of the second plurality of exits; based on the determining that the second table of the source database client is accessed by the third exit and by the fourth exit, modifying at least one of the third exit, the fourth exit, or second execution order data describing an order for executing the second plurality of exits; and after the modifying of the third exit, the fourth exit, or the second execution order data, and after the copying, re-executing the second plurality of exits, the re-executing of the second plurality of exits comprising executing at least two of the second plurality of exits in parallel.

In Example 12, the subject matter of any one or more of Examples 10-11 optionally includes the modifying of at least one of the first exit, the second exit, or the first execution order data comprising modifying at least one of the first exit or the second exit to remove access to the first table.

In Example 13, the subject matter of any one or more of Examples 10-12 optionally includes the modifying of at least one of the first exit, the second exit, or the first execution order data comprising modifying the first execution order data to indicate that the first exit and the second exit are to execute sequentially, the re-executing of the first plurality of exits comprising executing the first exit before executing the second exit.

In Example 14, the subject matter of any one or more of Examples 10-13 optionally includes before re-executing the first plurality of exits, configuring the exit runtime system to disable the database access trace mode.

In Example 15, the subject matter of any one or more of Examples 10-14 optionally includes the modifying of at least one of the first exit, the second exit, or the first execution order data comprising: generating a conflict message describing the accessing of the first table by the first exit and by the second exit; sending the conflict message to a user; and receiving, from the user, a modification to at least one of the first exit, the second exit, or the first execution order data.

In Example 16, the subject matter of any one or more of Examples 10-15 optionally includes generating first exit access data using the first exit trace data, the first exit access data describing at least one table from the source database client or the target database client accessed by the first exit during the executing of the first plurality of exits in the database access trace mode; and generating second exit access data using the first exit trace data, the second exit access data describing at least one table from the source database client or the target database client accessed by the second exit during the executing of the first plurality of exits in the database access trace mode, the determining that the first table of the source database client is accessed by the first exit and the second exit being based at least in part on the first exit access data and the second exit access data.

In Example 17, the subject matter of Example 16 optionally includes generating first table access data using the first exit access data and the second exit access data, the first table access data describing accesses to the first table by exits of the first plurality of exits during the executing of the first plurality of exits in the database access trace mode, the determining that the first table of the source database client is accessed by the first exit and the second exit being based at least in part on the first table access data.

In Example 18, the subject matter of Example 17 optionally includes the generating of the first table access data being based at least in part on the first exit access data and the second exit access data.

Example 19 is a non-transitory machine-readable medium comprising instructions thereon that, when executed by at least one processor, cause the at least one processor to perform operations comprising: accessing, by an exit runtime system executing at the at least one processor, a first plurality of exits, each exit of the first plurality of exits comprising software code for performing a pre-copy task; executing, by the exit runtime system, the first plurality of exits in a database access trace mode, the executing of the first plurality of exits generating first exit trace data describing accesses by the first plurality of exits to at least one of a source database client or a target database client; determining, using the first exit trace data, that a first table of the source database client is accessed by a first exit of the first plurality of exits and a second exit of the first plurality of exits; based on the determining that the first table of the source database client is accessed by the first exit and the second exit, modifying at least one of the first exit, the second exit, or first execution order data describing an order for executing the first plurality of exits; after the modifying of at least one of the first exit, the second exit, or the first execution order data, re-executing the first plurality of exits, the re-executing of the first plurality of exits comprising executing at least two of the first plurality of exits in parallel, the re-executing of the first plurality of exits generating exit result data; and copying at least a portion of source database client data from the source database client to the target database client, the copying being based at least in part on the exit result data.

In Example 20, the subject matter of Example 19 optionally includes the operations further comprising: accessing, by the exit runtime system, a second plurality of exits, each exit of the second plurality of exits comprising software code for performing a postprocessing task; executing, by the exit runtime system, the second plurality of exits in the database access trace mode, the executing of the second plurality of exits generating second exit trace data describing accesses by the second plurality of exits to at least one of the source database client or the target database client; determining, using the second exit trace data, that a second table of the source database client is accessed by a third exit of the second plurality of exits and by a fourth exit of the second plurality of exits; based on the determining that the second table of the source database client is accessed by the third exit and by the fourth exit, modifying at least one of the third exit, the fourth exit, or second execution order data describing an order for executing the second plurality of exits; and after the modifying of the third exit, the fourth exit, or the second execution order data, and after the copying, re-executing the second plurality of exits, the re-executing of the second plurality of exits comprising executing at least two of the second plurality of exits in parallel.

Figure 6:
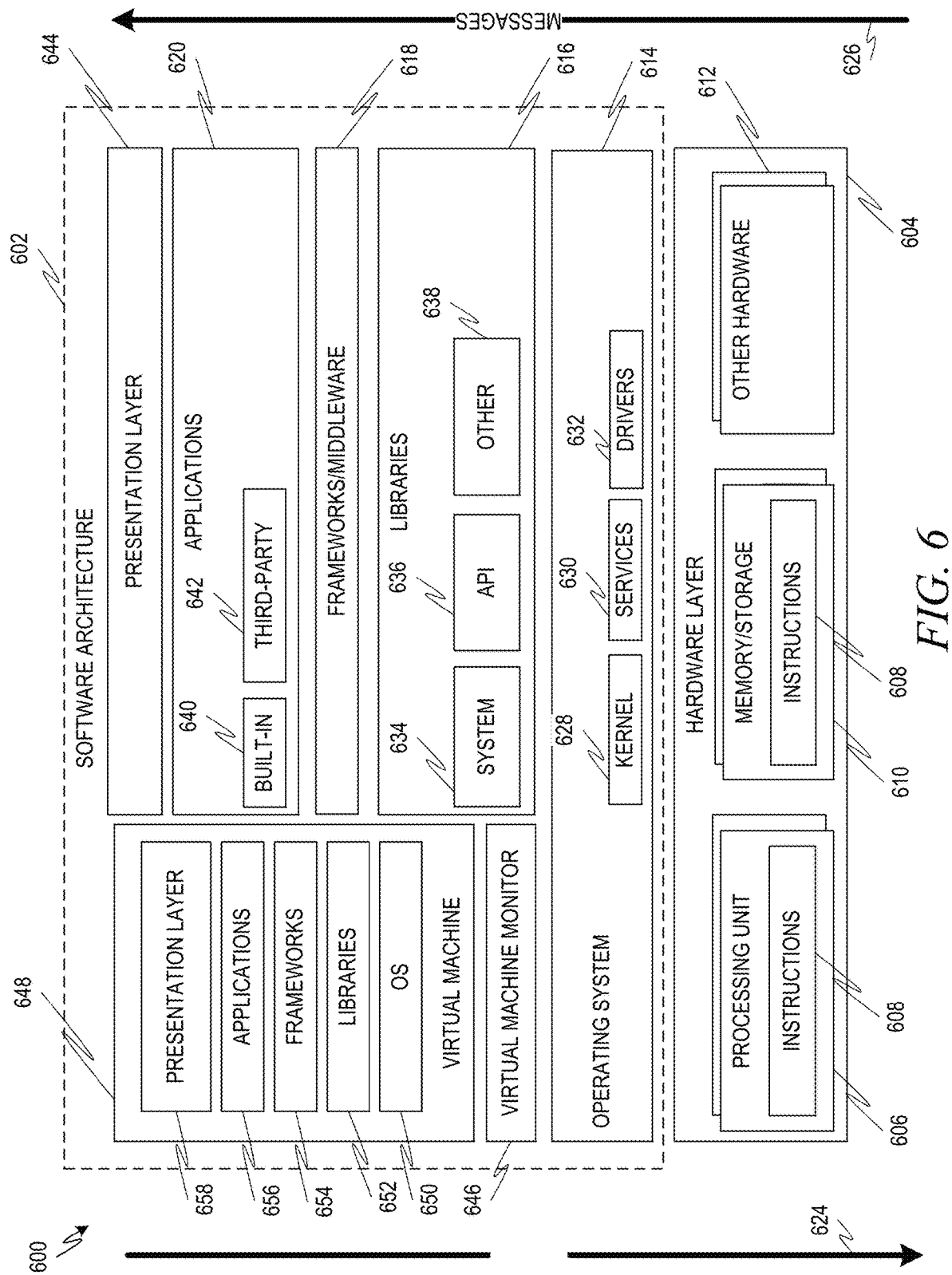
FIG. 6 is a block diagram showing one example of an architecture for a computing device.

FIG. 6 is a block diagram 600 showing one example of a software architecture 602 for a computing device. The architecture 602 may be used in conjunction with various hardware architectures, for example, as described herein. FIG. 6 is merely a non-limiting example of a software architecture and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system of FIG. 7.

The representative hardware layer 604 comprises one or more processing units 606 having associated executable instructions 608. Executable instructions 608 represent the executable instructions of the software architecture 602, including implementation of the methods, modules, subsystems, and components, and so forth described herein, and may also include memory and/or storage modules 610, which also have executable instructions 608. Hardware layer 604 may also comprise other hardware as indicated by other hardware 612 which represents any other hardware of the hardware layer 604, such as the other hardware illustrated as part of the architecture 602.

In the example architecture of FIG. 6, the software architecture 602 may be conceptualized as a stack of layers where each layer provides particular functionality. For example, the software architecture 602 may include layers such as an operating system 614, libraries 616, middleware layer 618, applications 620, and presentation layer 644. Operationally, the applications 620 and/or other components within the layers may invoke API calls 624 through the software stack and access a response, returned values, and so forth illustrated as messages 626 in response to the API calls 624. The layers illustrated are representative in nature and not all software architectures have all layers. For example, some mobile or special purpose operating systems may not provide a middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The middleware layer 618 (also sometimes referred to as frameworks) may provide a higher-level common infrastructure that may be utilized by the applications 620 and/or other software components/modules. For example, the middleware layer 618 may provide various graphic user interface (GUI) functions, high-level resource management, high-level location services, and so forth. The middleware layer 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built-in operating system functions (e.g., kernel 628, services 630 and/or drivers 632), libraries (e.g., system 634, API libraries 636, and other libraries 638), and middleware layer 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine 648 as well as the interface with the host operating system (i.e., operating system 614). A software architecture executes within the virtual machine 648 such as an operating system 650, libraries 652, frameworks/middleware 654, applications 656 and/or presentation layer 658. These layers of software architecture executing within the virtual machine 648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
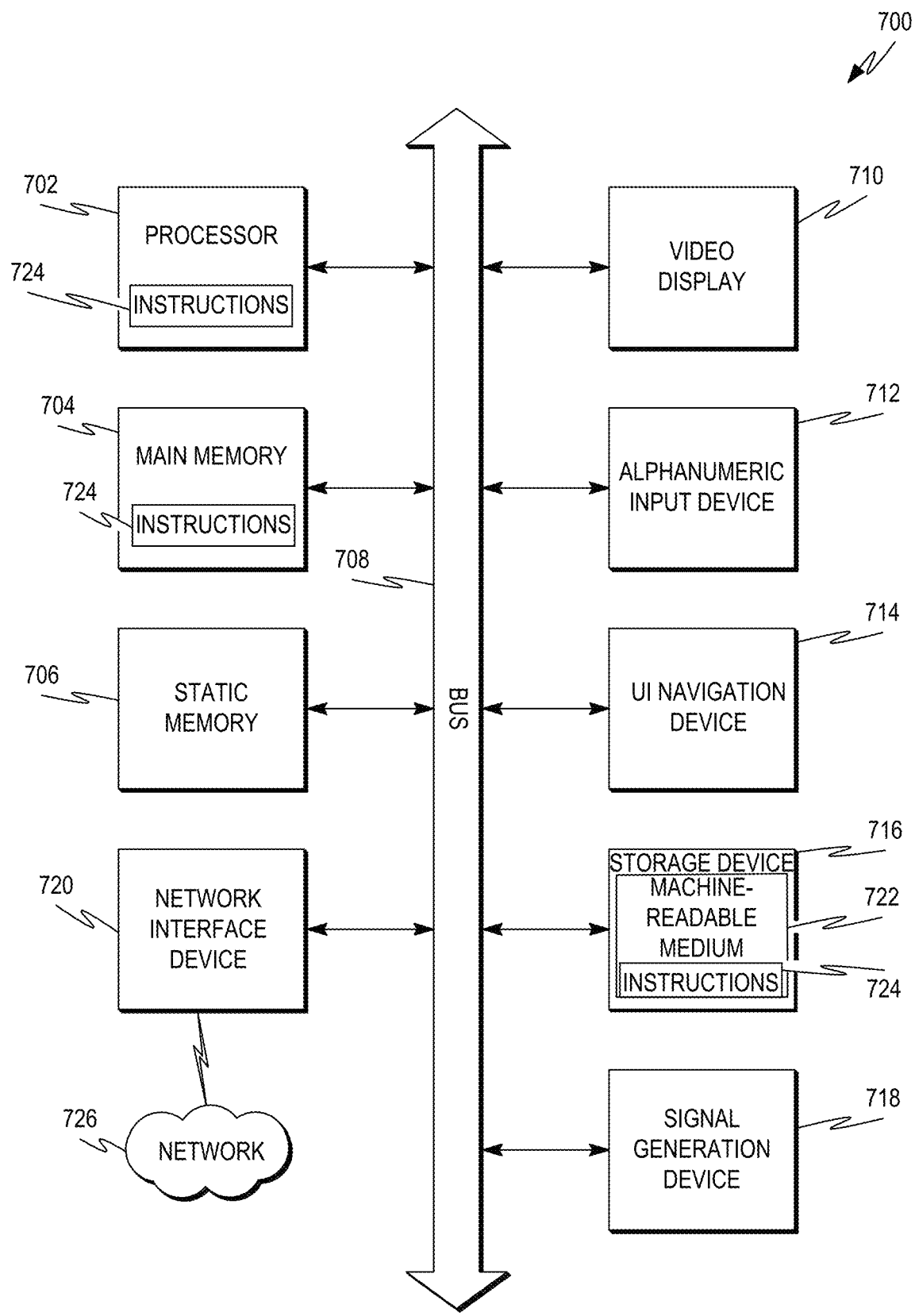
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 that may have stored thereon one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for copying a source database client to a target database client, comprising:
    at least one processor programmed to perform operations comprising:
    accessing, by an exit runtime system executing at the at least one processor, a first plurality of exits, each exit of the first plurality of exits comprising software code for performing a pre-copy task;
    executing, by the exit runtime system, the first plurality of exits in a database access trace mode, the executing of the first plurality of exits generating first exit trace data describing accesses by the first plurality of exits to at least one of the source database client or the target database client;

determining, using the first exit trace data, that a first table of the source database client is accessed by a first exit of the first plurality of exits and a second exit of the first plurality of exits;

based on the determining that the first table of the source database client is accessed by the first exit and the second exit, modifying at least one of the first exit, the second exit, or first execution order data describing an order for executing the first plurality of exits;

after the modifying of at least one of the first exit, the second exit, or the first execution order data, re-executing the first plurality of exits, the re-executing of the first plurality of exits comprising executing at least two of the first plurality of exits in parallel, the re-executing of the first plurality of exits generating exit result data; and copying at least a portion of source database client data from the source database client to the target database client, the copying being based at least in part on the exit result data.

2. The system of claim 1, the operations further comprising:

accessing, by the exit runtime system, a second plurality of exits, each exit of the second plurality of exits comprising software code for performing a postprocessing task;

executing, by the exit runtime system, the second plurality of exits in the database access trace mode, the executing of the second plurality of exits generating second exit trace data describing accesses by the second plurality of exits to at least one of the source database client or the target database client;

determining, using the second exit trace data, that a second table of the source database client is accessed by a third exit of the second plurality of exits and by a fourth exit of the second plurality of exits;

based on the determining that the second table of the source database client is accessed by the third exit and by the fourth exit, modifying at least one of the third exit, the fourth exit, or second execution order data describing an order for executing the second plurality of exits; and after the modifying of the third exit, the fourth exit, or the second execution order data, and after the copying, re-executing the second plurality of exits, the re-executing of the second plurality of exits comprising executing at least two of the second plurality of exits in parallel.

3. The system of claim 1, the modifying of at least one of the first exit, the second exit, or the first execution order data comprising modifying at least one of the first exit or the second exit to remove access to the first table.

4. The system of claim 1, the modifying of at least one of the first exit, the second exit, or the first execution order data comprising modifying the first execution order data to indicate that the first exit and the second exit are to execute sequentially, the re-executing of the first plurality of exits comprising executing the first exit before executing the second exit.

5. The system of claim 1, the operations further comprising before re-executing the first plurality of exits, configuring the exit runtime system to disable the database access trace mode.

6. The system of claim 1, the modifying of at least one of the first exit, the second exit, or the first execution order data comprising:

generating a conflict message describing the accessing of the first table by the first exit and by the second exit;

sending the conflict message to a user; and receiving, from the user, a modification to at least one of the first exit, the second exit, or the first execution order data.

7. The system of claim 1, the operations further comprising:

generating first exit access data using the first exit trace data, the first exit access data describing at least one table from the source database client or the target database client accessed by the first exit during the executing of the first plurality of exits in the database access trace mode; and generating second exit access data using the first exit trace data, the second exit access data describing at least one table from the source database client or the target database client accessed by the second exit during the executing of the first plurality of exits in the database access trace mode, the determining that the first table of the source database client is accessed by the first exit and the second exit being based at least in part on the first exit access data and the second exit access data.

8. The system of claim 7, the operations further comprising generating first table access data using the first exit access data and the second exit access data, the first table access data describing accesses to the first table by exits of the first plurality of exits during the executing of the first plurality of exits in the database access trace mode, the determining that the first table of the source database client is accessed by the first exit and the second exit being based at least in part on the first table access data.

9. The system of claim 8, the generating of the first table access data being based at least in part on the first exit access data and the second exit access data.

10. A method of copying a source database client to a target database client, the method comprising:

accessing, by an exit runtime system, a first plurality of exits, each exit of the first plurality of exits comprising software code for performing a pre-copy task, the exit runtime system comprising at least one executable software component;

executing, by the exit runtime system, the first plurality of exits in a database access trace mode, the executing of the first plurality of exits generating first exit trace data describing accesses by the first plurality of exits to at least one of the source database client or the target database client;

determining, using the first exit trace data, that a first table of the source database client is accessed by a first exit of the first plurality of exits and a second exit of the first plurality of exits;

based on the determining that the first table of the source database client is accessed by the first exit and the second exit, modifying at least one of the first exit, the second exit, or first execution order data describing an order for executing the first plurality of exits;

after the modifying of at least one of the first exit, the second exit, or the first execution order data, re-executing the first plurality of exits, the re-executing of the first plurality of exits comprising executing at least two of the first plurality of exits in parallel, the re-executing of the first plurality of exits generating exit result data; and copying at least a portion of source database client data from the source database client to the target database client, the copying being based at least in part on the exit result data.

11. The method of claim 10, further comprising:
accessing, by the exit runtime system, a second plurality of exits, each exit of the second plurality of exits comprising software code for performing a postprocessing task;
executing, by the exit runtime system, the second plurality of exits in the database access trace mode, the executing of the second plurality of exits generating second exit trace data describing accesses by the second plurality of exits to at least one of the source database client or the target database client;
determining, using the second exit trace data, that a second table of the source database client is accessed by a third exit of the second plurality of exits and by a fourth exit of the second plurality of exits;
based on the determining that the second table of the source database client is accessed by the third exit and by the fourth exit, modifying at least one of the third exit, the fourth exit, or second execution order data describing an order for executing the second plurality of exits; and
after the modifying of the third exit, the fourth exit, or the second execution order data, and after the copying, re-executing the second plurality of exits, the re-executing of the second plurality of exits comprising executing at least two of the second plurality of exits in parallel.

12. The method of claim 10, the modifying of at least one of the first exit, the second exit, or the first execution order data comprising modifying at least one of the first exit or the second exit to remove access to the first table.

13. The method of claim 10, the modifying of at least one of the first exit, the second exit, or the first execution order data comprising modifying the first execution order data to indicate that the first exit and the second exit are to execute sequentially, the re-executing of the first plurality of exits comprising executing the first exit before executing the second exit.

14. The method of claim 10, further comprising before re-executing the first plurality of exits, configuring the exit runtime system to disable the database access trace mode.

15. The method of claim 10, the modifying of at least one of the first exit, the second exit, or the first execution order data comprising:
generating a conflict message describing the accessing of the first table by the first exit and by the second exit;
sending the conflict message to a user; and
receiving, from the user, a modification to at least one of the first exit, the second exit, or the first execution order data.

16. The method of claim 10, further comprising:
generating first exit access data using the first exit trace data, the first exit access data describing at least one table from the source database client or the target database client accessed by the first exit during the executing of the first plurality of exits in the database access trace mode; and
generating second exit access data using the first exit trace data, the second exit access data describing at least one table from the source database client or the target database client accessed by the second exit during the executing of the first plurality of exits in the database access trace mode, the determining that the first table of the source database client is accessed by the first exit and the second exit being based at least in part on the first exit access data and the second exit access data.

17. The method of claim 16, further comprising generating first table access data using the first exit access data and the second exit access data, the first table access data describing accesses to the first table by exits of the first plurality of exits during the executing of the first plurality of exits in the database access trace mode, the determining that the first table of the source database client is accessed by the first exit and the second exit being based at least in part on the first table access data.

18. The method of claim 17, the generating of the first table access data being based at least in part on the first exit access data and the second exit access data.

19. A non-transitory machine-readable medium comprising instructions thereon that, when executed by at least one processor, cause the at least one processor to perform operations comprising:
accessing, by an exit runtime system executing at the at least one processor, a first plurality of exits, each exit of the first plurality of exits comprising software code for performing a pre-copy task;
executing, by the exit runtime system, the first plurality of exits in a database access trace mode, the executing of the first plurality of exits generating first exit trace data describing accesses by the first plurality of exits to at least one of a source database client or a target database client;
determining, using the first exit trace data, that a first table of the source database client is accessed by a first exit of the first plurality of exits and a second exit of the first plurality of exits;
based on the determining that the first table of the source database client is accessed by the first exit and the second exit, modifying at least one of the first exit, the second exit, or first execution order data describing an order for executing the first plurality of exits;
after the modifying of at least one of the first exit, the second exit, or the first execution order data, re-executing the first plurality of exits, the re-executing of the first plurality of exits comprising executing at least two of the first plurality of exits in parallel, the re-executing of the first plurality of exits generating exit result data; and
copying at least a portion of source database client data from the source database client to the target database client, the copying being based at least in part on the exit result data.

20. The non-transitory machine-readable medium of claim 19, the operations further comprising:
accessing, by the exit runtime system, a second plurality of exits, each exit of the second plurality of exits comprising software code for performing a postprocessing task;
executing, by the exit runtime system, the second plurality of exits in the database access trace mode, the executing of the second plurality of exits generating second exit trace data describing accesses by the second plurality of exits to at least one of the source database client or the target database client;
determining, using the second exit trace data, that a second table of the source database client is accessed by a third exit of the second plurality of exits and by a fourth exit of the second plurality of exits;
based on the determining that the second table of the source database client is accessed by the third exit and by the fourth exit, modifying at least one of the third exit, the fourth exit, or second execution order data describing an order for executing the second plurality of exits; and after the modifying of the third exit, the fourth exit, or the second execution order data, and after the copying, re-executing the second plurality of exits, the re-executing of the second plurality of exits comprising executing at least two of the second plurality of exits in parallel.

* * * * *